US011555541B2

(12) United States Patent
Li et al.

(10) Patent No.: US 11,555,541 B2
(45) Date of Patent: Jan. 17, 2023

(54) COOLING TOWER SPEED REDUCER

(71) Applicant: SUMITOMO HEAVY INDUSTRIES, LTD., Tokyo (JP)

(72) Inventors: Bin Li, Edegem (BE); Biao Wang, Edegem (BE)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 17/132,702

(22) Filed: Dec. 23, 2020

(65) Prior Publication Data
US 2021/0199190 A1    Jul. 1, 2021

(30) Foreign Application Priority Data
Dec. 26, 2019 (JP) .............................. JP2019-235384

(51) Int. Cl.
*F16H 57/04* (2010.01)
*F16H 57/021* (2012.01)
*F16H 57/038* (2012.01)

(52) U.S. Cl.
CPC ....... *F16H 57/0416* (2013.01); *F16H 57/021* (2013.01); *F16H 57/038* (2013.01); *F16H 57/0493* (2013.01)

(58) Field of Classification Search
CPC ............. F16H 57/0416; F16H 57/0493; F16H 57/021; F16H 57/038
See application file for complete search history.

(56) References Cited

U.S. PATENT DOCUMENTS

| 2,147,391 A | * | 2/1939 | Acker | ................. F16H 57/0415 |
| | | | | 74/606 A |
| 3,353,591 A | * | 11/1967 | Zak | ..................... F16H 57/0416 |
| | | | | 165/47 |
| 4,074,590 A | * | 2/1978 | Jorg | .................... F16H 57/0498 |
| | | | | 165/122 |

(Continued)

FOREIGN PATENT DOCUMENTS

| DE | 10 2008 051 874 A1 | 4/2010 | |
| JP | 06272750 A | * 9/1994 | ......... F16H 57/0415 |

(Continued)

OTHER PUBLICATIONS

EPO Translation of the Description of JP 2004263739 A, Matsuo et al., Sep. 24, 2004. (Year: 2022).*

(Continued)

*Primary Examiner* — Daniel D Yabut
(74) *Attorney, Agent, or Firm* — Michael Best & Friedrich LLP

(57) ABSTRACT

There is provided a perpendicular speed reducer including an input shaft, a reduction mechanism that reduces a speed of rotation of the input shaft, an output shaft that outputs the speed-reduced rotation, and a casing that accommodates the reduction mechanism. The input shaft and the output shaft are perpendicular to each other. The casing includes a bearing hole formed on a first side surface to support the output shaft, a fin provided along a direction toward the bearing hole, and a groove portion provided along an axial direction of the output shaft on a second side surface adjacent to the first side surface.

19 Claims, 5 Drawing Sheets

(56) References Cited

U.S. PATENT DOCUMENTS

| | | | |
|---|---|---|---|
| 8,555,747 B2 * | 10/2013 | Kant | .................... F16H 57/0415 |
| | | | 74/606 A |
| 2010/0095804 A1 * | 4/2010 | Gilbert | .................... F16H 57/02 |
| | | | 74/606 A |
| 2014/0338495 A1 | 11/2014 | Hayashi | |
| 2015/0296658 A1 * | 10/2015 | Kimura | ............... F16H 57/0416 |
| | | | 361/697 |
| 2016/0290478 A1 | 10/2016 | Kimura | |
| 2018/0087648 A1 * | 3/2018 | Poster | ..................... B64C 27/12 |

FOREIGN PATENT DOCUMENTS

| | | | | |
|---|---|---|---|---|
| JP | 2001165285 A | * | 6/2001 | ......... F16H 57/0415 |
| JP | 2004-263739 A | | 9/2004 | |
| JP | 2019-173897 A | | 10/2019 | |

OTHER PUBLICATIONS

JPO Translation of the Description of JP 06272750 A, Nara et al., Sep. 27, 1994. (Year: 2022).*

EPO Translation of the Description of JP 2001165285 A, Kamiya, Jun. 19, 2001. (Year: 2022).*

Search Report issued in European Application No. 20215946.3, dated Mar. 5, 2021.

* cited by examiner

COOLING TOWER SPEED REDUCER

RELATED APPLICATIONS

The content of Japanese Patent Application No. 2019-235384 on the basis of which priority benefits are claimed in an accompanying application data sheet, is in its entirety incorporated herein by reference.

BACKGROUND

Technical Field

Certain embodiments of the present invention relate to a perpendicular speed reducer.

Description of Related Art

In the related art, a perpendicular speed reducer is known in which an input shaft and an output shaft are perpendicular to each other. In the perpendicular speed reducer, a temperature of a casing rises due to heat generated in a gear meshing portion or a bearing. Accordingly, it is necessary to cool the casing, particularly when an ambient temperature is high. In this case, a circulation device is provided so that a lubricant fetched out from the casing is cooled and the lubricant returns into the casing. However, there is a problem of a complicated device configuration.

SUMMARY

According to an embodiment of the present invention, there is provided a perpendicular speed reducer including an input shaft, a reduction mechanism that reduces a speed of rotation of the input shaft, an output shaft that outputs the speed-reduced rotation, and a casing that accommodates the reduction mechanism. The input shaft and the output shaft are perpendicular to each other.

The casing includes a bearing hole formed on a first side surface to support the output shaft, a fin provided along a direction toward the bearing hole, and a groove portion provided along an axial direction of the output shaft on a second side surface adjacent to the first side surface.

DETAILED DESCRIPTION

It is desirable to preferably cool a casing with a simple configuration.

According to an embodiment of the present invention, a casing can be preferably cooled with a simple configuration.

Hereinafter, an embodiment of the present invention will be described in detail with reference to the drawings.

Figure 1:
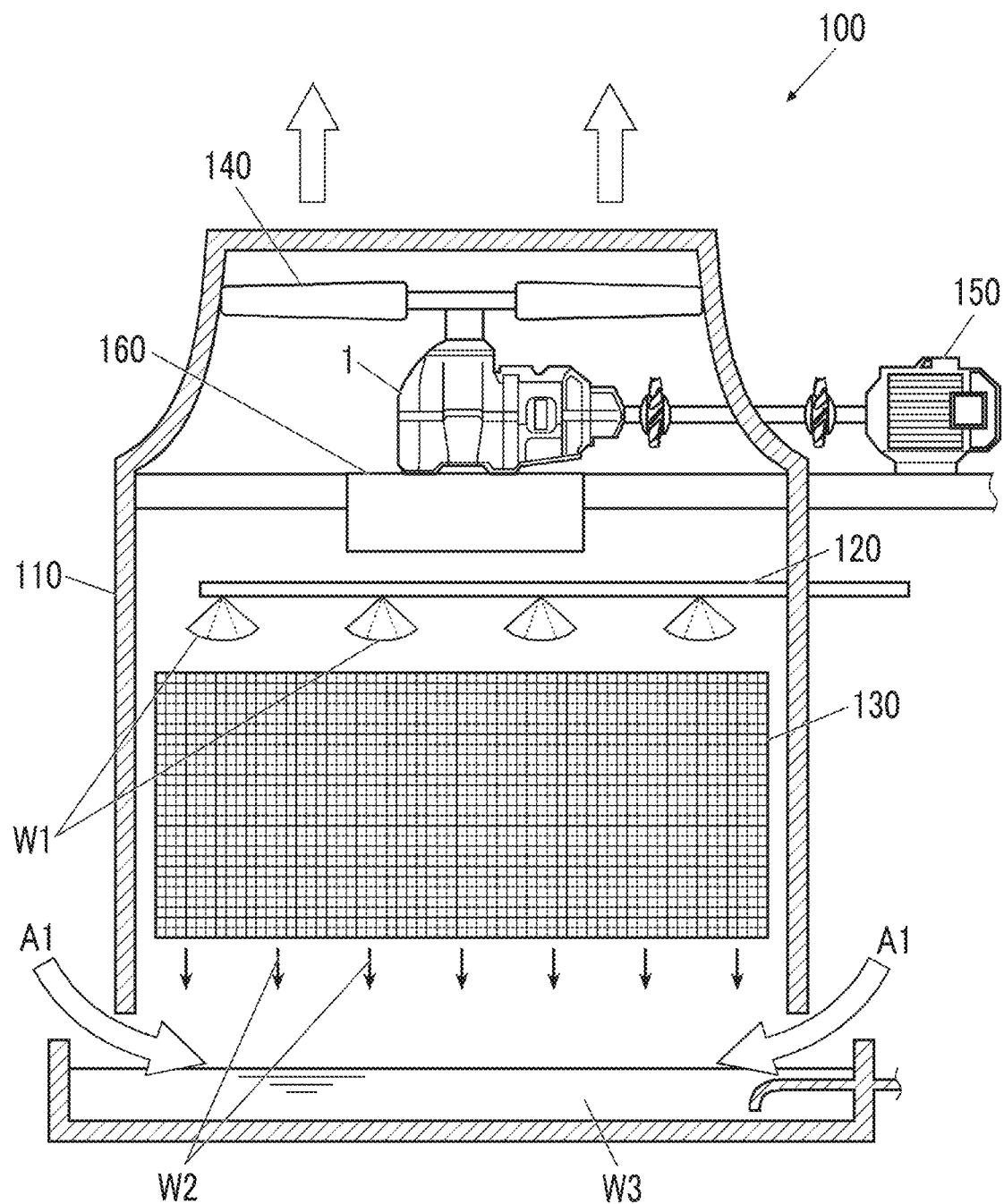
FIG. 1 is a sectional view illustrating a cooling tower to which a perpendicular speed reducer according to an embodiment is applied.

FIG. 1 is a sectional view illustrating a cooling tower 100 to which a perpendicular speed reducer 1 according to an embodiment is applied.

As illustrated in the drawing, the perpendicular speed reducer 1 according to the present embodiment can be used for various usages without the usage being particularly limited. For example, the perpendicular speed reducer 1 is applicable to a cooling tower 100.

The cooling tower 100 cools cooling water used in a cryocooler for air conditioning or a process fluid for refining crude oil. In the cooling tower 100, warmed cooling water W1 introduced into a tower unit 110 is sprayed onto a surface of a filler 130 by a sprinkler 120, and external air A1 fetched by a cooling fan 140 is blown to dropping water W2. In this manner, the water W2 is partially evaporated, the remaining water is cooled, and cooling water W3 collected in a bottom portion of the tower unit 110 is circulated to an air conditioner by a pump.

The cooling fan 140 is provided in an upper portion of the tower unit 110, and discharges moisture evaporated in the tower unit 110 to external air above. The cooling fan 140 is connected to a motor 150 via the perpendicular speed reducer 1. The perpendicular speed reducer 1 reduces a speed of power of the motor 150, and outputs the power to drive the cooling fan 140.

Various types of the cooling towers are present in addition to an open type illustrated in FIG. 1. The perpendicular speed reducer 1 of the present embodiment can be used for any type of the cooling towers (for driving the cooling fan). For example, the perpendicular speed reducer 1 can also be used for an air-cooled heat exchanger (air fin cooler) having a closed type, a suction ventilation type, or a force ventilation type.

Configuration of Perpendicular Speed Reducer

Subsequently, a configuration of the perpendicular speed reducer 1 will be described.

Figure 2A:
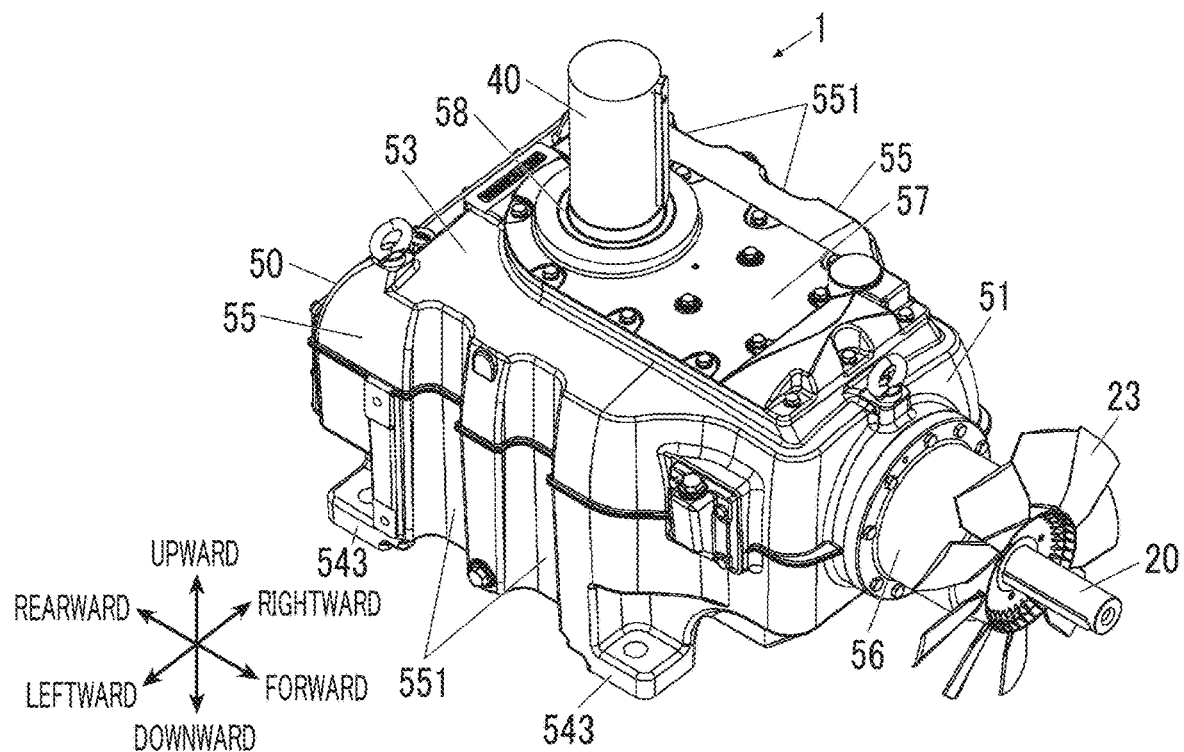
FIG. 2A is a perspective view when the perpendicular speed reducer according to the embodiment is viewed from an obliquely upper front side.
Figure 2B:
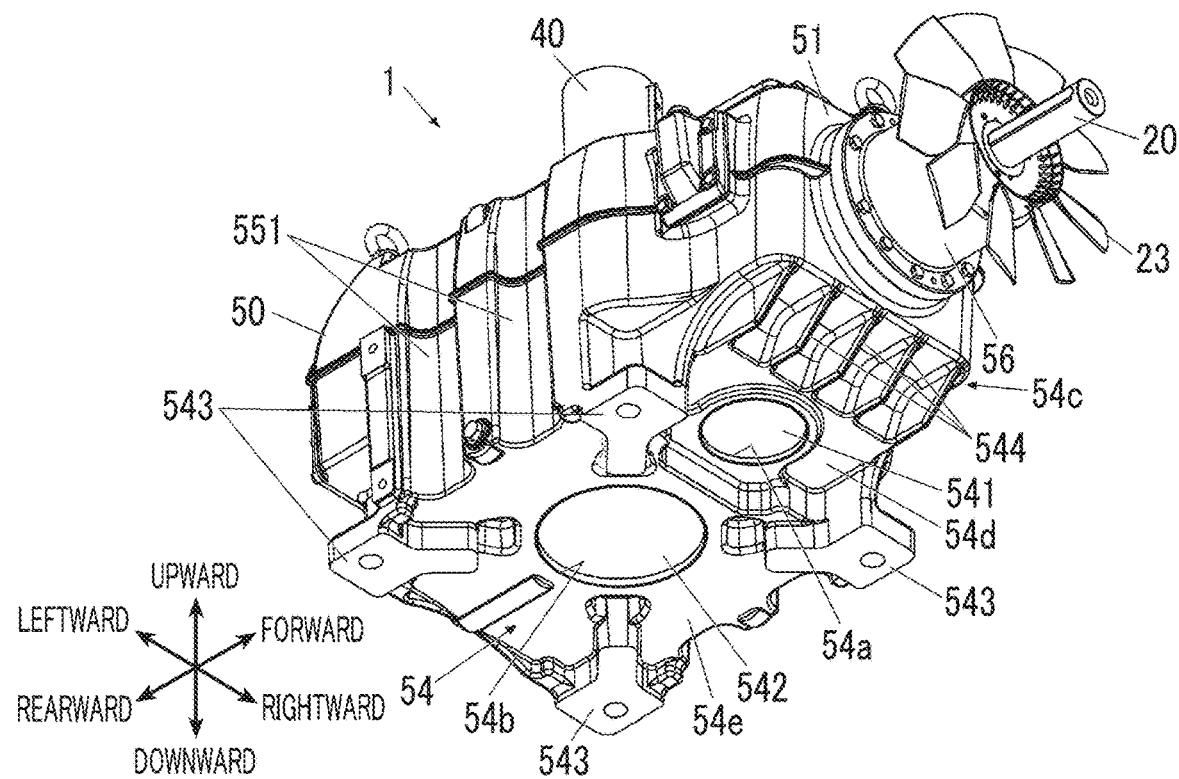
FIG. 2B is a perspective view when the perpendicular speed reducer is viewed from an obliquely lower front side.
Figure 3A:
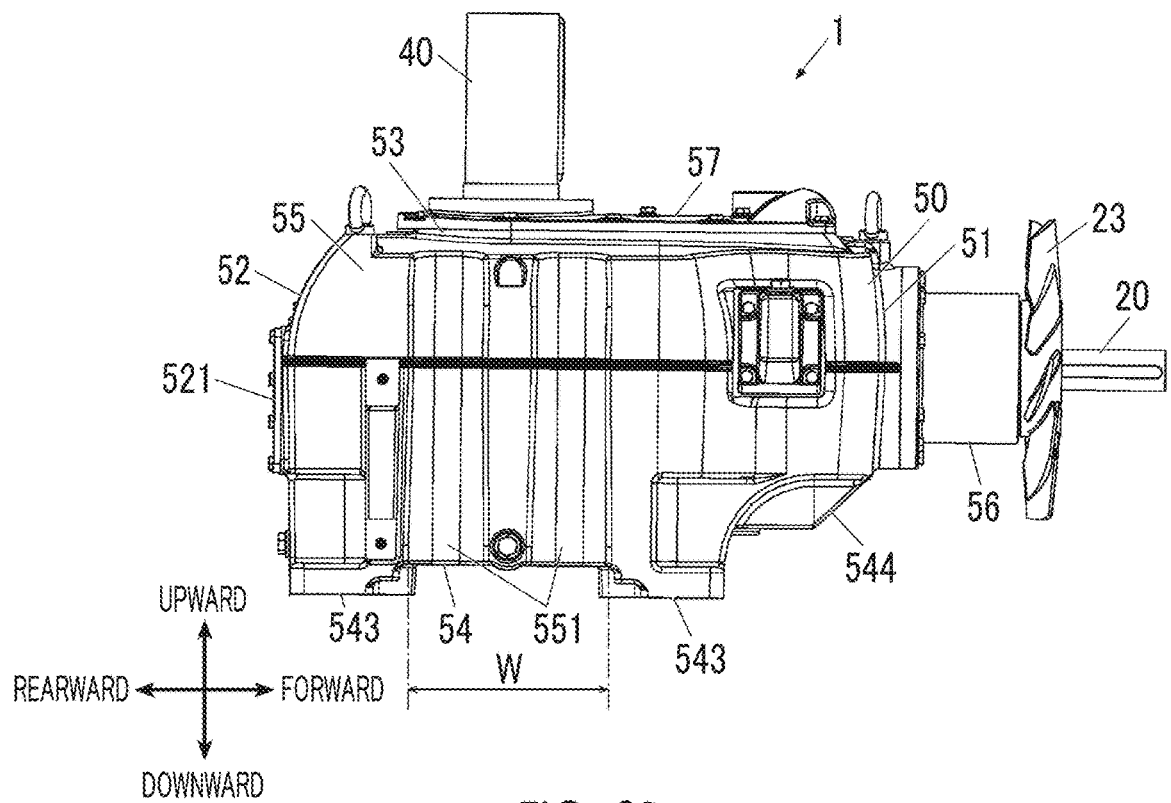
FIG. 3A is a side view of the perpendicular speed reducer according to the embodiment.
Figure 3B:
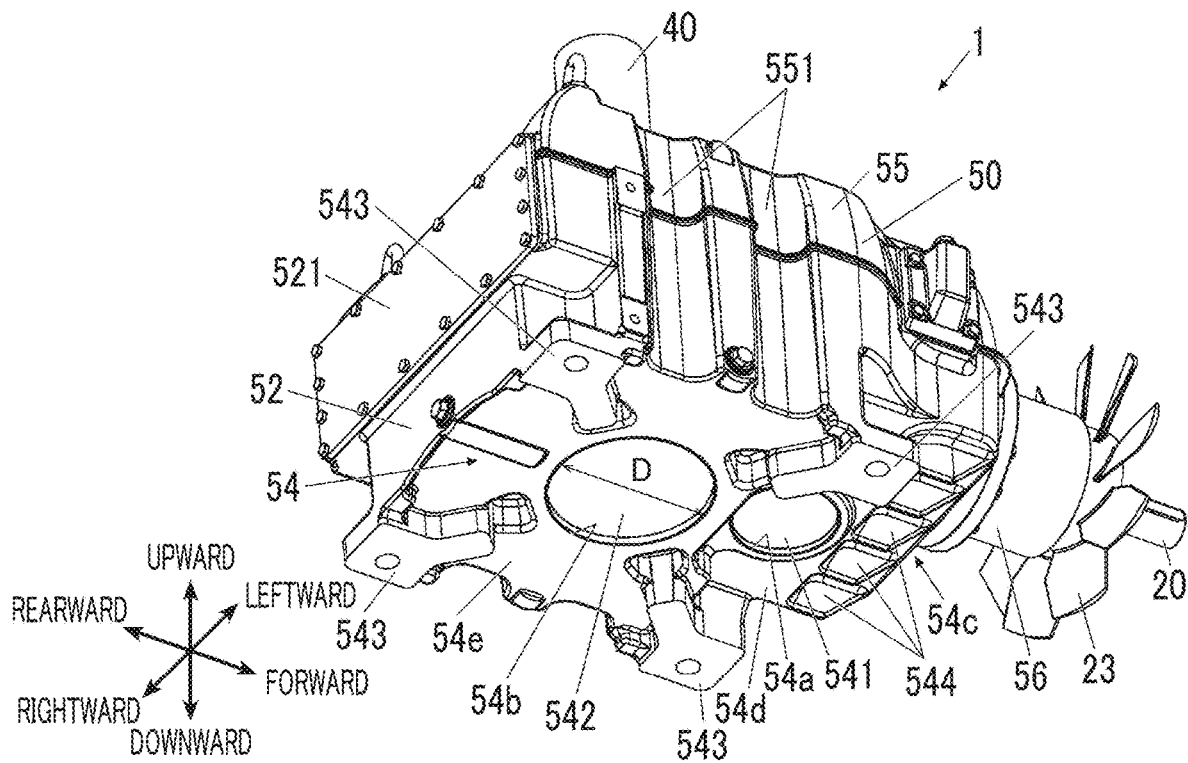
FIG. 3B is a perspective view when the perpendicular speed reducer is viewed from an obliquely lower rear side.
Figure 4:
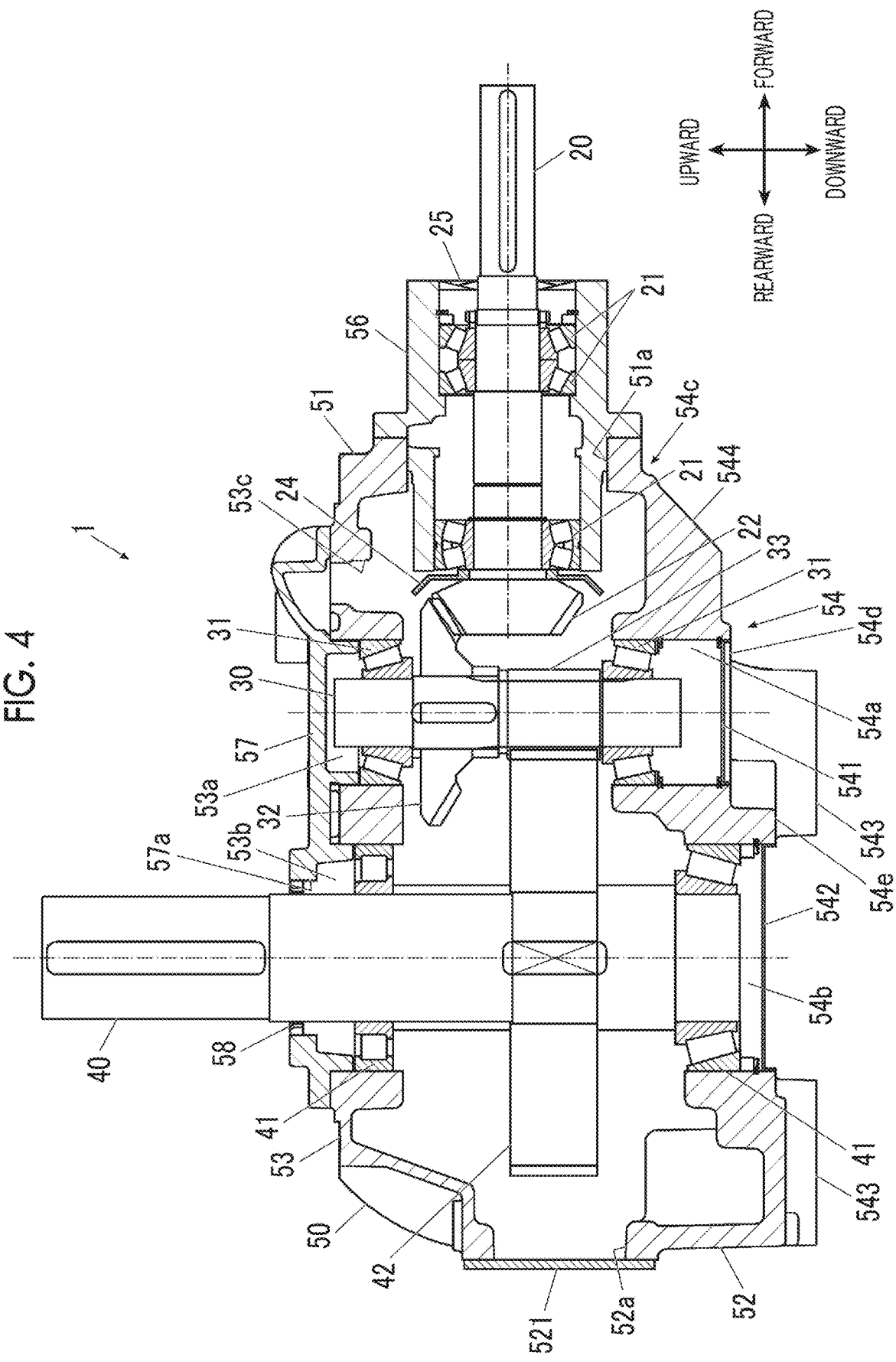
FIG. 4 is a side sectional view of the perpendicular speed reducer according to the embodiment.

FIGS. 2A and 2B are perspective views when the perpendicular speed reducer 1 is viewed from an obliquely upper front side and an obliquely lower front side. FIGS. 3A and 3B are a side view of the perpendicular speed reducer 1 and a perspective view when the perpendicular speed reducer 1 is viewed from an obliquely lower rear side. FIG. 4 is a side sectional view of the perpendicular speed reducer 1.

As illustrated in FIGS. 2A to 4, the perpendicular speed reducer 1 includes an input shaft 20, an intermediate shaft 30, and an output shaft 40 which are sequentially connected to transmit power, and a casing 50 that accommodates the shafts.

The input shaft 20 is disposed so that an axial direction is oriented in a substantially horizontal direction, and the intermediate shaft 30 and the output shaft 40 are disposed so that the respective axial directions are oriented in an upward-downward direction substantially perpendicular to the input shaft 20. The input shaft 20, the intermediate shaft 30, and the output shaft 40 are pivotally supported by bearings 21, 31, and 41 disposed between the respective shafts and the casing 50. In addition, the respective axes of the input shaft 20, the intermediate shaft 30, and the output shaft 40 are located in the mutually same plane.

In the following description, directions of the perpendicular speed reducer 1 will be defined as follows. A direction along the input shaft 20 (rightward-leftward direction on a paper surface in FIG. 4) will be set as a "forward-rearward direction", a vertical direction perpendicular to the forward-rearward direction on the paper surface in FIG. 4 will be set as the "rightward-leftward direction", and a direction along the output shaft 40 (upward-downward direction on the paper surface in FIG. 4) will be set as the "upward-downward direction". In addition, in the "forward-rearward direction", a side where the input shaft 20 is exposed from the casing 50 will be set as a "front side", and a side opposite thereto will be set as a "rear side".

A bevel pinion 22 is formed in a rear side tip of the input shaft 20. The bevel pinion 22 meshes with a bevel gear 32 connected to the intermediate shaft 30 to be integrally rotated. An intermediate gear 33 is formed on an outer peripheral surface of the intermediate shaft 30. The intermediate gear 33 meshes with an output gear 42 connected to the output shaft 40 to be integrally rotated.

A front side tip of the input shaft 20 is exposed from the casing 50, and a motor 150 (refer to FIG. 1) is connected to the tip to receive input power (rotating motion). An upper end of the output shaft 40 is exposed from the casing 50, and is connected to the cooling fan 140 (refer to FIG. 1).

According to this configuration, a rotating motion input to the input shaft 20 is transmitted to the output shaft 40 while a speed of the rotational motion is reduced via a gear set of the bevel pinion 22 and the bevel gear 32 and a gear set of the intermediate gear 33 and the output gear 42, and is output from the output shaft 40 to the cooling fan 140. Here, the bevel pinion 22, the bevel gear 32, the intermediate shaft 30, the intermediate gear 33, and the output gear 42 form a reduction mechanism that reduces a speed of rotation of the input shaft 20 and transmits the rotation to the output shaft 40. However, a specific configuration of the reduction mechanism is not particularly limited as long as the reduction mechanism is accommodated in the casing 50 and reduces the speed of the rotation of the input shaft 20 to transmit the rotation to the output shaft 40. For example, the gear set of the bevel pinion 22 and the bevel gear 32 may be a gear set of a hypoid gear or a worm gear.

In addition, a fan (impeller) 23 is disposed in a tip of a front side portion exposed (protruded) from the casing 50 in the input shaft 20 (omitted in the illustration in FIG. 4). The fan 23 rotates in association with the rotation of the input shaft 20, and blows wind toward the casing 50 located behind.

The casing 50 is an integral cast component (made of cast iron) formed in a substantially rectangular parallelepiped shape that is slightly long in the forward-rearward direction. The casing 50 has a front surface 51, a rear surface 52, an upper surface 53, a lower surface 54, and both right and left side surfaces 55 and 55.

In addition, in FIGS. 1, 2A, and 2B, although a protrusion in a direction perpendicular to an upward-downward direction is illustrated at an approximately middle height of the front surface 51 and the side surface 55, the protrusion is a parting line (joint line of a mold), and is not a dividing line that divides the casing 50 upward and downward.

A circular through-hole 51a is formed on the front surface 51 of the casing 50. A shaft support member 56 that pivotally supports the input shaft 20 via a bearing 21 is attached to the through-hole 51a. The shaft support member 56 is formed in a substantially cylindrical shape along the forward-rearward direction, and is fixed to the casing 50 in a state where a rear half portion is inserted into the casing 50 from the through-hole 51a. A front end of the shaft support member 56 has a seal member 25 that seals a gap formed with the input shaft 20.

A through-hole 52a is formed on the rear surface 52 of the casing 50. The through-hole 52a has a wide shape in the rightward-leftward direction, and is formed to have a size through which a gear member of the bevel gear 32 and the output gear 42 can pass. The through-hole 52a is a hole portion for incorporating the bevel gear 32 and the output gear 42 into the casing 50 when assembled. When assembled, the intermediate gear 33 and the output gear 42 are inserted into the casing 50 from the through-hole 52a, and are attached to the intermediate shaft 30 and the output shaft 40 inside the casing 50. The through-hole 52a is closed by a cover member 521.

First bearing holes 53a and 54a for supporting the intermediate shaft 30 and second bearing holes 53b and 54b for supporting the output shaft 40 are formed on the upper surface 53 and the lower surface 54 of the casing 50. The first bearing holes 53a and 54a are coaxially formed to have substantially the same inner diameter, and each of bearings 31 is internally fitted thereto so that the intermediate shaft 30 is pivotally supported via the bearings 31. The second bearing holes 53b and 54b are coaxially formed to have substantially the same inner diameter, and each of bearings 41 is internally fitted thereto so that the output shaft 40 is pivotally supported via the bearings 41. The first bearing hole 54a and the second bearing hole 54b on the lower surface 54 are closed by cover members 541 and 542 at height (depth) positions close to openings thereof. The cover members 541 and 542 preferably have satisfactory thermal conductivity. In the casing 50, portions having the first bearing holes 53a and 54a and the second bearing holes 53b and 54b are all integrally formed of a single material.

The upper surface 53 of the casing 50 is smoothly connected to the front surface 51 in the front end, and is formed in a flat surface shape.

A substantially flat plate-shaped top cover 57 is attached to the upper surface 53 of the casing 50. The top cover 57 exposes the output shaft 40 from the insertion hole 57a located above the first bearing hole 53a, and closes the second bearing hole 53b. A seal member 58 that seals a gap between the top cover 57 and the output shaft 40 is provided inside the insertion hole 57a.

In addition, the top cover 57 closes the oil circulation hole 53c formed on the upper surface 53 of the casing 50. The oil circulation hole 53c is formed in front of the first bearing hole 53a, and the lubricant wound upward inside the casing 50 is discharged upward of the upper surface 53 by the splasher 24 attached to the input shaft 20. The lubricant is supplied from the upper side of the upper surface 53 to the bearing 31 inside the first bearing hole 53a, and returns to the casing 50.

The lower surface 54 of the casing 50 is formed to be gradually located downward as the lower surface 54 is oriented rearward from a front end. In the present embodiment, the lower surface 54 of the casing 50 has a front end portion 54c, a middle stage portion 54d, and a rear half portion 54e which are located downward in this stepwise order as the lower surface 54 is oriented rearward.

Out of the portions, a plurality of (five in the present embodiment) fins 544 are erected along the forward-rearward direction in the front end portion 54c of the lower surface 54. The plurality of fins 544 are aligned at an equal distance in the rightward-leftward direction. A bottom surface between the two fins 544 adjacent to each other is formed in a smoothly recessed and curved surface shape, and connects a front end of the lower surface 54 and the middle stage portion 54d to each other. The plurality of fins 544 guide the wind of the fan 23 provided in the input shaft 20 to the second bearing hole 54b formed in the rear half portion 54e of the lower surface 54 and supporting the output shaft 40.

The number, a distance, or a height of the fins 544 is not particularly limited.

The first bearing hole 54a for supporting the intermediate shaft 30 is open in the middle stage portion 54d of the lower surface 54.

The second bearing hole 54b for supporting the output shaft 40 is open in the rear half portion 54e of the lower surface 54.

In addition, the rear half portion 54e of the lower surface 54 has four leg portions 543 fixed to a base 160 (refer to FIG. 1) of an upper portion of the cooling tower 100. The four leg portions 543 are disposed at four obliquely front, rear, right, and left corners around the second bearing hole 54b in the rear half portion 54e of the lower surface 54. However, the two leg portions 543 on the front side are disposed slightly in front of the rear half portion 54e of the lower surface 54, and are located on both right and left sides of the first bearing hole 54a. Each of the leg portions 543 protrudes downward of the rear half portion 54e of the lower surface 54.

A front half portion of both side surfaces 55 of the casing 50 is formed in a smooth surface shape so that a front end is smoothly connected to the front surface 51 and is gradually located to a lateral side as the front end is oriented toward the rear half portion.

In addition, the rear half portion of the side surface 55 of the casing 50 has a plurality of (two in the present embodiment) groove portions 551 provided along the axial direction (upward-downward direction) of the output shaft 40. The plurality of groove portions 551 are aligned in the forward-rearward direction, and a lower end thereof is connected to the rear half portion 54e of the lower surface 54 of the casing 50 between the two leg portions 543. In addition, the plurality of groove portions 551 are disposed at positions where the plurality of groove portions 551 overlap the second bearing holes 53b and 54b that support the output shaft 40 when viewed in the rightward-leftward direction perpendicular to the side surface 55.

The number, a width, or a depth of the groove portions 551 is not particularly limited. However, from a viewpoint of cooling efficiency achieved by passing wind and manufacturing convenience, it is preferable that the number is not too large and the width is not too narrow. For example, it is preferable that each of the groove portions 551 is formed to have a width wider than a distance between the two adjacent fins 544 formed on the lower surface 54. In addition, it is preferable that a width W from an end to an end of the two groove portions 551 is larger than a width (that is, the inner diameter D) in the forward-rearward direction of the second bearing holes 53b and 54b.

Operation of Perpendicular Speed Reducer

Subsequently, an operation of the perpendicular speed reducer 1 will be described.

In the perpendicular speed reducer 1, when power of the motor 150 is input to rotate the input shaft 20, the speed of this motion is reduced via the gear set of the bevel pinion 22 and the bevel gear 32, and the motion is transmitted to the intermediate shaft 30. Thereafter, the speed of the motion is further reduced via the gear set of the intermediate gear 33 and the output gear 42, and the motion is transmitted to the output shaft 40. In this way, the speed-reduced power is output from the output shaft 40 to the cooling fan 140, and the cooling fan 140 is rotationally driven.

In this case, in the perpendicular speed reducer 1, the fan 23 is rotated in association with the rotation of the input shaft 20, and the fan 23 blows wind toward the casing 50 located behind.

Figure 5A:
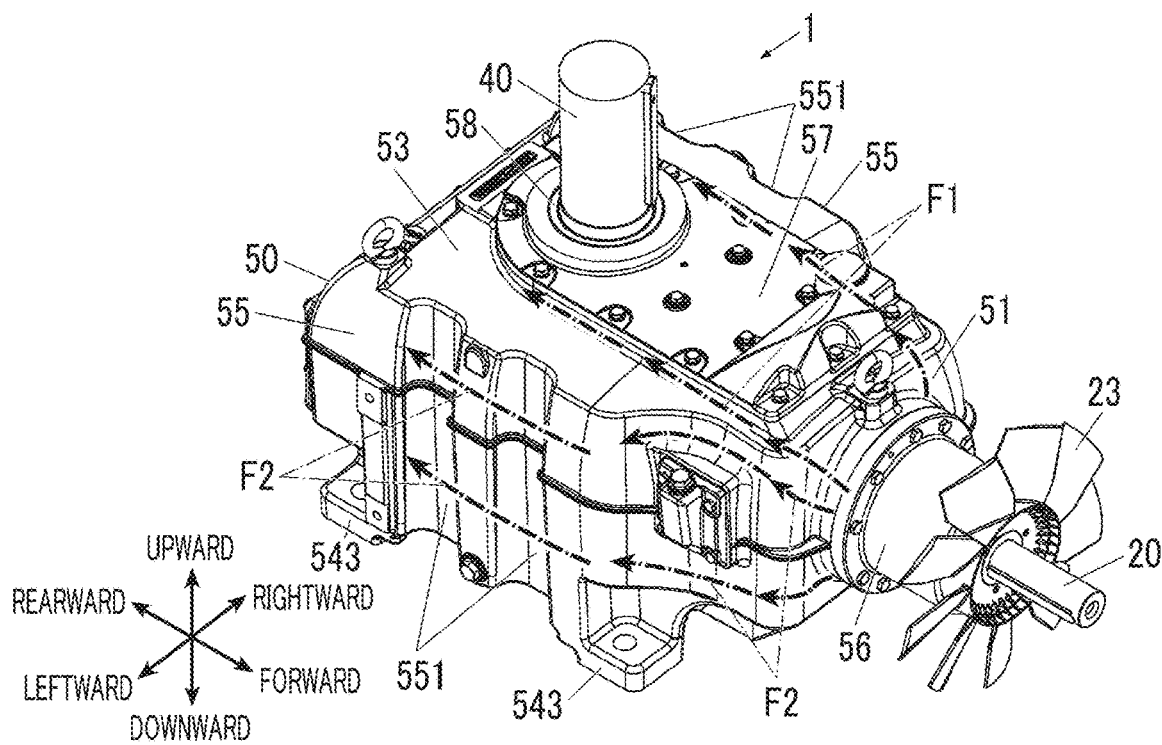
FIGS. 5A and 5B are views illustrating an airflow flowing on a surface of a casing.

As illustrated in FIG. 5A, in the wind blown from the fan 23, an airflow F1 flowing to the upper side of the casing 50 smoothly flows from the front surface 51 to the upper surface 53 of the casing 50. Thereafter, the airflow F1 flows rearward on the upper surface 53 and the top cover 57, and cools the upper surface 53 and the top cover 57.

In addition, an airflow F2 from the fan 23 to both sides of the casing 50 (only the left side is illustrated in FIG. 5A) smoothly flows from the front surface 51 to the side surface 55 of the casing 50. Thereafter, the airflow F2 smoothly flows rearward on the side surface 55, and cools the side surface 55.

Figure 5B:
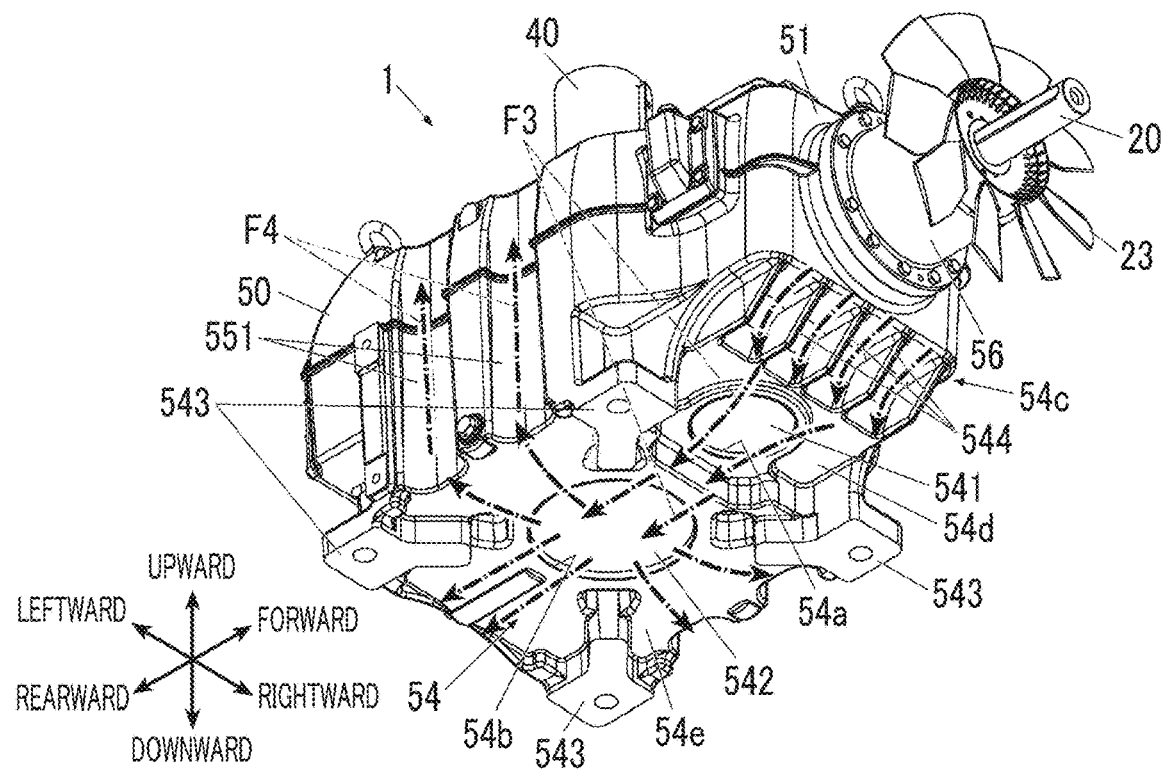

In addition, as illustrated in FIG. 5B, an airflow F3 from the fan 23 to the lower side of the casing 50 smoothly flows from the front surface 51 to the lower surface 54 of the casing 50. Thereafter, the airflow F3 flows rearward on the lower surface 54, and flows to the front end portion 54c, the middle stage portion 54d, and the rear half portion 54e in this order.

In the wind, while the airflow F3 flowing through the front end portion 54c of the lower surface 54 is guided rearward by the plurality of fins 544 erected along the forward-rearward direction, the airflow F3 removes and cools the heat of the front side portion of the casing 50 from the fins 544.

The airflow F3 flowing from the front end portion 54c to the middle stage portion 54d passes through a periphery of the first bearing hole 54a (cover member 541) formed in the middle stage portion 54d, and further flows rearward. In this case, the airflow F3 cools the periphery of the first bearing hole 54a (cover member 541) on the lower surface 54, and mainly removes the heat generated by the bearing 31 that supports the intermediate shaft 30 inside the first bearing hole 54a.

The airflow F3 flowing from the middle stage portion 54d to the rear half portion 54e passes through and cools the periphery of the second bearing hole 54b (cover member 542) formed in the rear half portion 54e, and mainly removes the heat generated by the bearing 41 that supports the output shaft 40 cools inside the second bearing hole 54b.

The airflow F3 passing through the periphery of the second bearing hole 54b of the lower surface 54 is branched into a flow that flows rearward without any change and a flow that flows to both the right and left sides.

In the flows, the flow that flows to both sides is an airflow F4 that passes between the two leg portions 543 and flows through the side surface 55 of the casing 50 (only the left side surface is illustrated in FIG. 5B). The airflow F4 flows from the lower surface 54 of the casing 50 into the plurality of groove portions 551 of the side surface 55. Then, the airflow F4 flows upward along the groove portions 551 inside the plurality of groove portions 551, and mainly removes the heat generated by the output shaft 40, thereby cooling the casing 50.

Technical Effects of Present Embodiment

As described above, according to the present embodiment, the casing 50 has the fin 544 that guides the wind of the fan 23 provided in the input shaft 20 to the second bearing hole 54b of the lower surface 54, and the groove portion 551 provided along the axial direction of the output shaft 40 on the side surface 55 adjacent to the lower surface 54.

Therefore, the wind of the fan 23 passes through the periphery of the second bearing hole 54b of the lower surface 54 of the casing 50. Thereafter, the wind flows upward along the groove portion 551 of the side surface 55. In this manner, the heat generated by the bearing 41 supporting the output shaft 40 or the meshing portion of the output gear 42 can be preferably removed by the wind of the fan 23.

Therefore, compared to a case where the lubricant fetched out from the casing is cooled and returns into the casing, the casing 50 can be preferably cooled with a simple configuration.

In addition, according to the present embodiment, each of the groove portions 551 is formed to have a width wider than the distance between the two fins 544 adjacent to each other. Therefore, the airflow F3 passing between the fins 544 can preferably flow into the groove portion 551.

In addition, according to the present embodiment, the second bearing hole 54b and the plurality of groove portions 551 are disposed at positions where the second bearing hole 54b and the plurality of groove portions 551 overlap each other when viewed in the rightward-leftward direction.

Therefore, the second bearing holes 53b and 54b can be preferably cooled by the airflow F4 flowing through the plurality of groove portions 551.

In addition, according to the present embodiment, the width W from an end to an end of the plurality of groove portions 551 is larger than the width (inner diameter D) in the forward-rearward direction of the second bearing holes 53b and 54b.

Therefore, the second bearing holes 53b and 54b can be more preferably cooled by the airflow F4 flowing through the plurality of groove portions 551.

In addition, according to the present embodiment, in the casing 50, the portions having the second bearing holes 53b and 54b for supporting the output shaft 40 are all integrally formed of a single material. That is, the casing 50 is a vertically integrated casing in which the portion having the second bearing hole 53b on the upper side and the portion having the second bearing hole 54b on the lower side are not separated from each other.

Therefore, unlike a vertically divided casing in which the upper side and the lower side are separated from each other, it is not necessary to provide a fixing flange on the side surface. Consequently, the flange does not hinder the formation of the groove portion 551, and the groove portion 551 can be preferably provided on the side surface 55 of the casing 50.

Furthermore, the casing 50 has the through-hole 52a for internally incorporating the gear member of the bevel gear 32 or the output gear 42, and the cover member 521 for closing the through-hole 52a. Therefore, it is not necessary to adopt the vertically divided casing as the casing 50, and the gear member can be preferably accommodated inside the casing 50.

Others

Hitherto, the embodiment of the present invention has been described. However, the present invention is not limited to the above-described embodiment.

For example, in the above-described embodiment, the fin 544 guides the wind from the fan 23 provided in the input shaft 20 to the second bearing hole 54b. However, the fin according to the present invention may be provided to guide the wind toward the second bearing hole that supports the output shaft (that is, along a direction toward the second bearing hole). A specific position or shape of the fin is not particularly limited.

In addition, in the above-described embodiment, the casing 50 is cooled by the wind of the fan 23 provided in the input shaft 20. However, the fan 23 may be replaced with other blowing means that blows the wind toward the casing 50. Alternatively, it is not necessary to particularly provide the blowing means. For example, the casing 50 can be preferably cooled by the fin or the groove portion with external natural wind. In the above-described embodiment, the cooling fan 140 driven by the perpendicular speed reducer 1 generates upward wind. Therefore, the casing 50 can be further cooled by using the wind.

In addition, details in the above-described embodiment can be appropriately modified within the scope not departing from the concept of the invention.

It should be understood that the invention is not limited to the above-described embodiment, but may be modified into various forms on the basis of the spirit of the invention. Additionally, the modifications are included in the scope of the invention.

What is claimed is:

1. A perpendicular speed reducer comprising:
   an input shaft;
   a reduction mechanism that reduces, to a speed-reduced rotation, a speed of rotation of the input shaft;
   an output shaft that outputs the speed-reduced rotation to a first fan so as to drive the first fan;
   a casing that accommodates the reduction mechanism; and
   a second fan disposed in a portion of the input shaft that protrudes from the casing,
   wherein the input shaft and the output shaft are perpendicular to each other,
   wherein the casing comprises:
      a bearing hole formed on a first side surface to support the output shaft,
      a fin provided along a direction toward the bearing hole,
      a groove portion provided along an axial direction of the output shaft on a second side surface adjacent to the first side surface, and
      a flow surface portion of which an outer shape of the casing gradually increases from a side surface on an input shaft side toward a side surface on an output shaft side so that airflow from the second fan flows smoothly,
   wherein the second side surface comprises:
      the side surface on the input shaft side, and
      the side surface on the output shaft side disposed on the output shaft side with respect to the side surface on the input shaft side, and
   wherein the groove portion is formed such that airflow generated by the first fan flows along the groove portion.

2. The perpendicular speed reducer according to claim 1, wherein the fin is provided along an axial direction of the input shaft to guide airflow of the second fan to the bearing hole.

3. The perpendicular speed reducer according to claim 2, wherein the fin is formed to be lowered in height toward the second fan.

4. The perpendicular speed reducer according to claim 1, wherein:
   the fin is one of a plurality of fins, and
   the groove portion is formed to have a width wider than a distance between two of the fins that are adjacent to each other.

5. The perpendicular speed reducer according to claim 1, wherein the bearing hole and the groove portion are disposed at positions where the bearing hole and the groove portion overlap each other when viewed in a direction perpendicular to the second side surface.

6. The perpendicular speed reducer according to claim 5, wherein:
the groove portion is one of a plurality of groove portions, and
a width from an end to an end of the plurality of groove portions is wider than a width of the bearing hole.

7. The perpendicular speed reducer according to claim 1, wherein:
the bearing hole is one of a plurality of bearing holes, and
portions comprising the plurality of bearing holes in the casing are all integrally formed of a single material.

8. The perpendicular speed reducer according to claim 7, wherein:
the reduction mechanism comprises a gear member, and
the casing comprises a hole portion for internally incorporating the gear member and a cover member for closing the hole portion.

9. The perpendicular speed reducer according to claim 8, wherein the hole portion comprises a size which allows the gear member to be incorporated into the casing from an outside of the casing.

10. The perpendicular speed reducer according to claim 8, wherein the hole portion is arranged on a side surface different from the first side surface.

11. The perpendicular speed reducer according to claim 8, wherein:
the casing comprises a second bearing hole which supports the output shaft on an opposite side of the bearing hole with the gear member interposed therebetween, and
a portion where the bearing hole is provided and a portion where the second bearing hole is provided are integrally formed of a single material.

12. The perpendicular speed reducer according to claim 1, wherein:
the fin is one of a plurality of fins, and
a bottom surface between two of the fins adjacent to each other is formed in a curved surface shape to be lowered in height toward the input shaft.

13. The perpendicular speed reducer according to claim 1, further comprising:
a bearing hole cover member configured to close the bearing hole,
wherein the bearing hole cover member includes a recess portion which is recessed toward the second side surface with respect to an end portion of the bearing hole.

14. The perpendicular speed reducer according to claim 1, further comprising:
a cover member configured to cover the output shaft,
wherein the cover member comprises a parallel portion formed along an axial direction of the input shaft.

15. The perpendicular speed reducer according to claim 1, further comprising:
a cover member configured to cover the output shaft, and
a splasher disposed in the casing so as to wind a lubricant upward inside the casing,
wherein the cover member closes an oil circulation hole formed radially outside the splasher and on an upper surface of the casing.

16. The perpendicular speed reducer according to claim 1, further comprising:
a leg portion installed on a base on which the perpendicular speed reducer is disposed,
wherein the leg portion comprises only legs installed on the base toward a direction perpendicular to the output shaft.

17. The perpendicular speed reducer according to claim 1, wherein:
the casing comprises an intermediate bearing hole disposed on an input shaft side with respect to the bearing hole, and
an end portion of the intermediate bearing hole is disposed axially inward into the casing in the axial direction of the output shaft with respect to and an end portion of the bearing hole.

18. A perpendicular speed reducer comprising:
an input shaft;
a reduction mechanism that reduces a speed of rotation of the input shaft;
an output shaft that outputs the speed-reduced rotation;
a casing that accommodates the reduction mechanism; and
a second fan disposed in a portion of the input shaft that protrudes from the casing,
wherein the input shaft and the output shaft are perpendicular to each other,
wherein the casing comprises:
a bearing hole formed on a first side surface to support the output shaft,
a fin provided along a direction toward the bearing hole,
a groove portion provided along an axial direction of the output shaft on a second side surface adjacent to the first side surface, and
a flow surface portion of which an outer shape of the casing gradually increases from a side surface on an input shaft side toward a side surface on an output shaft side so that airflow from the second fan flows smoothly,
wherein the second side surface comprises:
the side surface on the input shaft side, and
the side surface on the output shaft side disposed on the output shaft side with respect to the side surface on the input shaft side,
wherein a plurality of the fins are provided on a lower surface side when the output shaft is disposed vertically upward,
wherein a bottom surface between two adjacent fins is formed in a shape that gradually increases in outline,
wherein the fins are formed so that the height decreases toward the second fan,
wherein the perpendicular speed reducer further comprises:
a bearing hole cover member that closes an opening of the bearing hole, and
a recess that is recessed inside the casing from the opening of the bearing hole, and
wherein airflow, that flows through the fins, is configured to pass through the groove portion via the bearing hole cover member.

19. The perpendicular speed reducer according to claim 18, wherein a surface of the casing from which the output shaft protrudes comprises a second output shaft bearing hole and a second intermediate bearing hole that open, wherein a cover is provided to close the second output shaft bearing hole and the second intermediate bearing hole, and wherein the cover comprises a side surface portion so that airflow from the input shaft to the output shaft is configured to flow smoothly.

* * * * *